UNITED STATES PATENT OFFICE.

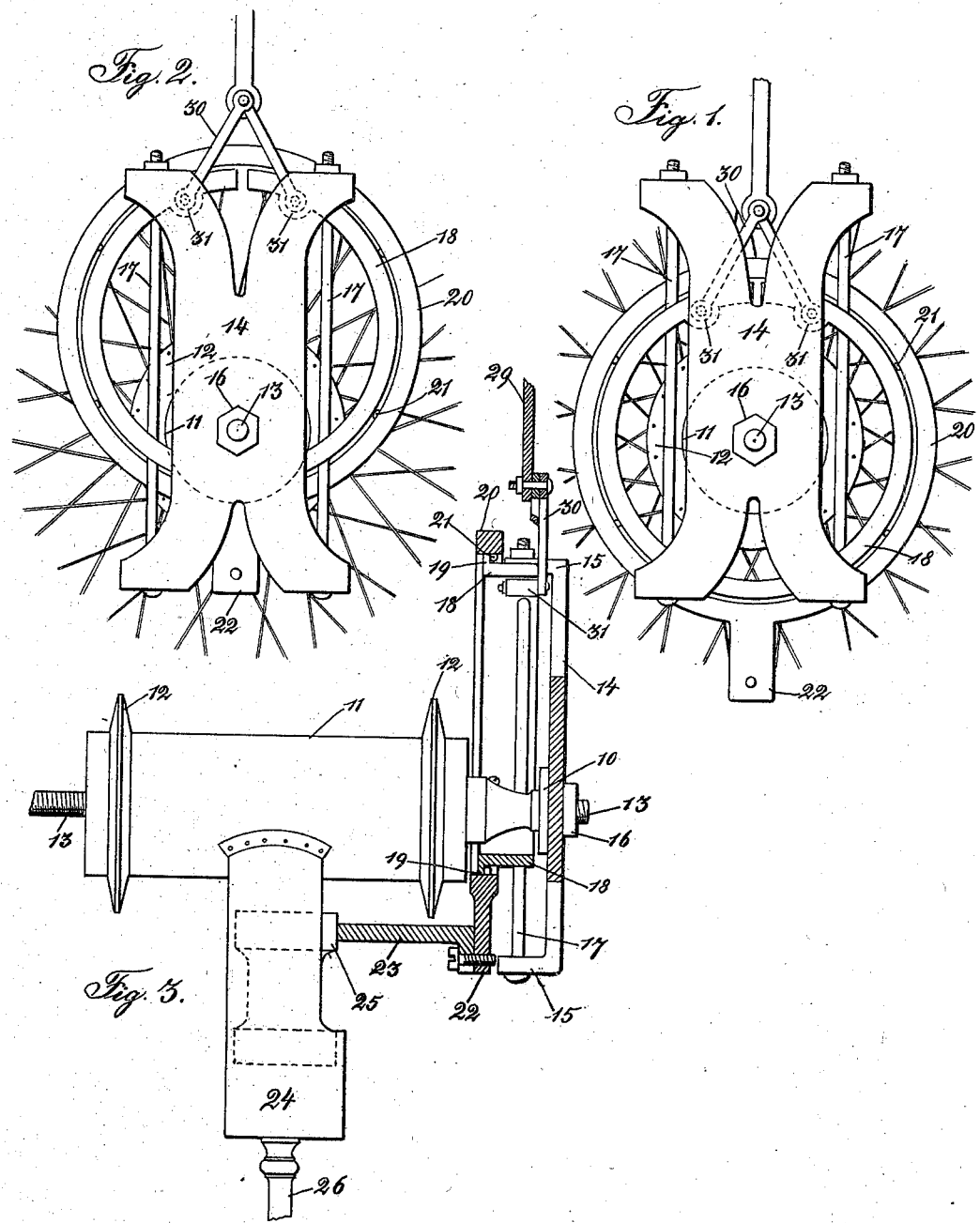

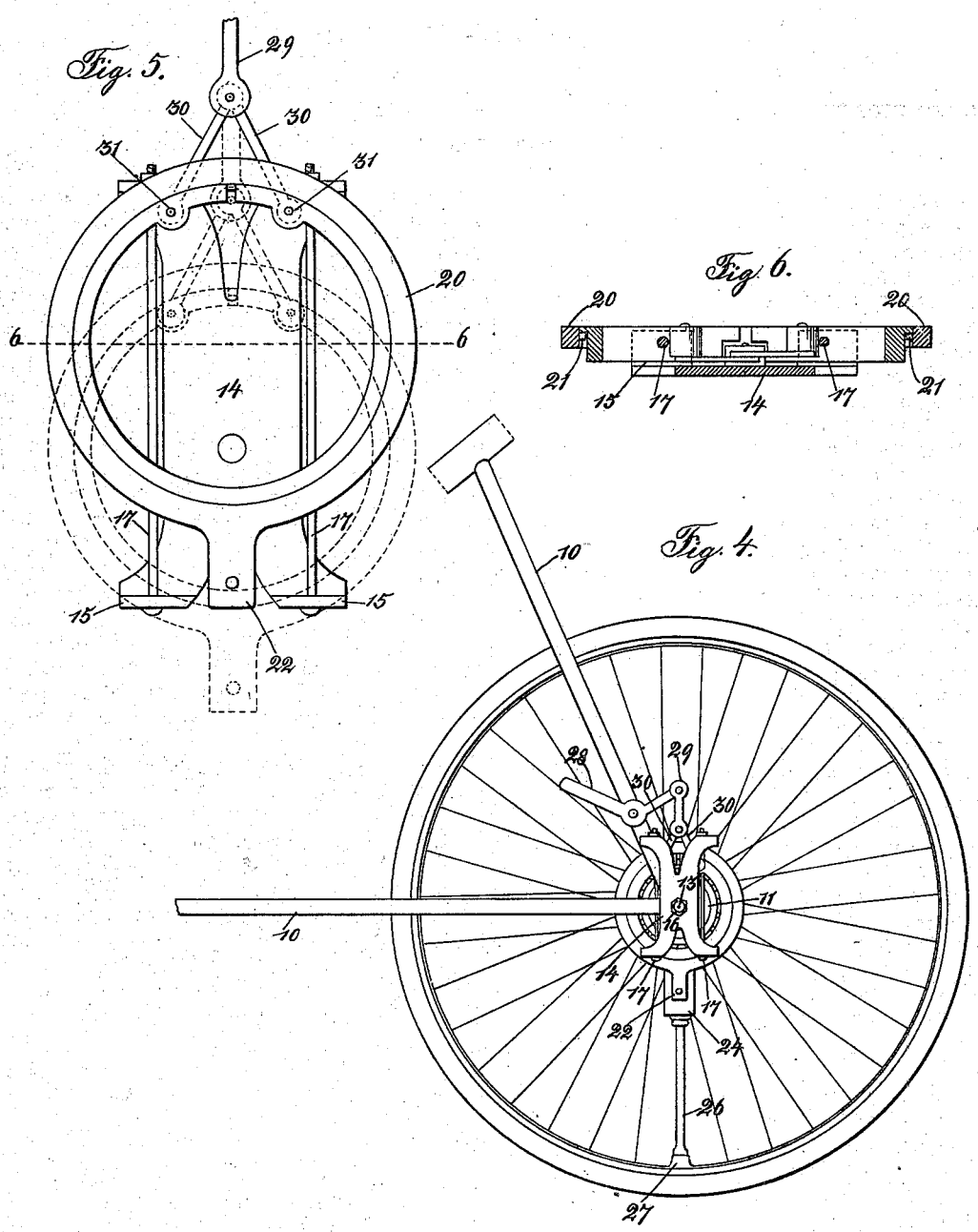

THEODORE A. DIEBOLD, OF STUART, IOWA.

AUTOMATIC BICYCLE-PUMP.

SPECIFICATION forming part of Letters Patent No. 709,397, dated September 16, 1902.

Application filed October 31, 1901. Serial No. 80,616. (No model.)

*To all whom it may concern:*

Be it known that I, THEODORE A. DIEBOLD, a citizen of the United States, residing at Stuart, in the county of Guthrie and State of Iowa, have invented certain new and useful Improvements in Automatic Bicycle-Pumps, of which the following is a specification.

The object of my invention is to provide a device of simple, durable, and inexpensive construction that may be permanently applied to the hub and to the axle of a bicycle-wheel and connected by means of a flexible hose with the valve of the bicycle-tire, by which the operator may by placing his feet upon the controlling-lever cause the pump to be automatically actuated as the bicycle advances over the ground surface, as required to inflate the tire.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows a detail side view of a part of my improvement applied to a bicycle hub and axle and shown in its inoperative position. Fig. 2 shows a similar view of the device shown in its operative position. Fig. 3 shows a vertical sectional view on the indicated line 3 3 of Fig. 2, and Fig. 4 shows a side elevation of the rear wheel of a bicycle and a portion of the frame thereof with my device applied thereto and in an inoperative position. Fig. 5 shows a detail side view of a part of my improvement applied to a bicycle hub and axle, this view being a view from the opposite side of the view shown in Fig. 1. Fig. 6 is a detail sectional view cut through line 6 6 of Fig. 5.

Referring to the accompanying drawings, I have used the reference-numeral 10 to indicate that portion of the bicycle-frame shown. 11 indicates the hub of the rear wheel, having the spoke-flanges 12, and 13 indicates the rear axle, extended through the said hub. These parts of the device are all of the ordinary construction, and hence further description thereof is unnecessary.

The reference-numeral 14 indicates a supporting-frame, having its upper and lower ends projected inwardly at 15. The axle 13 extends through the frame 14 and is firmly clamped in position by means of the nut 16. Hence the said frame 14 is rigidly supported on the axle, which is non-rotatable and which in turn is secured to the machine-frame 10 in the ordinary manner.

The reference-numeral 17 indicates two straight parallel rods leading from one of the ends 15 to the other and firmly fixed to said ends. These rods serve as supports for a split ring 18, which ring is provided with a flange 19 at its inner edge, said flange projecting outwardly from the center of the ring. Obviously this ring is non-rotatable and is capable of a vertical movement limited only by the ends 15. The said split ring 18 is mounted within a circular frame 20, which frame is provided with an annular recess designed to receive the flange 19, and said flange is held in position in the circular frame 20 by means of the pins 21, passed through the circular frame 20.

Formed on or fixed to the circular frame 20 is a radial arm 22, and fixed to this radial arm 22 is a rod 23, which projects inwardly toward the central portion of the hub 11 and between the spokes of the wheel. Attached to the central portion of the hub 11 is a pump-cylinder 24, having an opening in one side and also having on its interior a pump-piston 25. Attached to the outer end of the pump 24 is a flexible hose 26, which hose is attached to the valve-nipple 27 of the tire.

From the foregoing description it is obvious that so long as the circular frame 20 is in position concentric relative to the bicycle-hub the pump-piston will not be operated. However, as soon as the said circular frame 20 is placed in position eccentric relative to the bicycle-hub the rotary movement imparted to the hub will obviously cause the pump-piston 25 to reciprocate, because the frame 20 rotates with the wheel, and this supporting-ring 18 is stationary so far as rotary movement is concerned.

I have provided means of simple and inexpensive construction whereby the operator may at will readily throw the circular frame 20 to a position eccentric to the bicycle-hub, as follows: Mounted upon the machine-frame 10 is a lever 28. This lever is pivoted to an arm 29, which in turn is pivoted to two links 30, and these links are pivoted to the bosses 31 on the split ring 18 at opposite sides of the point at which the ring is split. It is to be remembered in this connection that the split ring is capable of vertical movement relative to the bicycle-axle upon the guide-rods 17. Hence it is obvious that when the lever 27 is operated in one direction the split ring, together with the circular frame 20, will be moved vertically to the position illustrated in Fig. 2 of the drawings. It it is obvious, further, that when the lever 28 is operated in this manner the split ring will be partially contracted, so that the circular frame 20 may freely rotate relative to the split ring. Hence in practical use the split ring and connected parts are normally held in position concentric relative to the axle, and when in this position the circular frame, the pump, and the rod connecting them all rotate freely about the axle without actuating the pump. Furthermore, if it is desired to inflate the tire the other end of the lever 28 is held downwardly, thus throwing the split ring and the circular frame eccentric relative to the axle, so that during each revolution of the circular frame and the hub one stroke is given to the piston 25. This may be continued so long as is necessary to fully inflate the tire. Then the lever is returned to its normal position without stopping the machine, and the pumping is discontinued.

Having thus described my invention, what I claim, and desire to secure by Letters Patent of the United States therefor, is—

1. An improved automatic bicycle-pump comprising, in combination, a bicycle-wheel, a stationary axle passed through the wheel-hub, and a pneumatic tire on the wheel, a frame secured to the wheel-axle, a ring vertically movable relative to said frame, a frame rotatable on said ring, a rod projecting from said frame inwardly toward the center of the bicycle-hub, a pump fixed to the hub, a piston in the pump connected with the said rod, and a tube leading from the pump to the tire of the wheel, and means for moving the ring and its frame to a position concentric relative to the axle or to a position eccentric relative thereto, for the purposes stated.

2. An automatic bicycle-pump, comprising in combination, a bicycle-wheel, a pneumatic tire thereon, a stationary axle passed through the wheel-hub, a frame fixed to the axle at one end of the hub, a split ring vertically movable relative to the frame, a circular frame mounted on the split ring and capable of rotation relative thereto, a pump fixed to the central portion of the hub, a rod connecting the circular ring with the pump-piston, a tube leading from the pump to the pneumatic tire, a lever connected with the machine-frame, an arm pivoted to the lever and two links pivoted to the said arm and to the end portions of the split ring, substantially as and for the purposes stated.

3. An improved bicycle-pump, comprising in combination, a bicycle-wheel, a pneumatic tire thereon, a stationary axle passed through the wheel-hub, a frame 14 fixed to the stationary axle, parallel rods 17 fixed to the frame 14 and extended vertically, a split ring vertically movable on said rods, a circular frame having an arm 20 mounted on the split ring, a pump fixed to the central portion of the wheel-hub, a piston in said pump, a rod connecting the arm 20 with the piston, a tube leading from the pump to the tire, a lever fulcrumed to the machine-frame, an arm pivoted to one end of the lever, two links pivoted to the arm and to the end portions of the split ring, substantially as and for the purposes stated.

THEODORE A. DIEBOLD.

Witnesses:
W. R. LANE,
D. E. HOLADAY.